United States Patent
Carolan

(10) Patent No.: US 8,886,950 B2
(45) Date of Patent: Nov. 11, 2014

(54) APPARATUS, METHODS, AND COMPUTER PROGRAM PRODUCTS FOR FACILITATING SECURE PASSWORD CREATION AND MANAGEMENT

(75) Inventor: Sean Carolan, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 957 days.

(21) Appl. No.: 12/337,005

(22) Filed: Dec. 17, 2008

(65) Prior Publication Data

US 2010/0154039 A1    Jun. 17, 2010

(51) Int. Cl.
*H04L 9/32* (2006.01)
*G06F 21/46* (2013.01)

(52) U.S. Cl.
CPC ...................................... *G06F 21/46* (2013.01)
USPC ......................................................... 713/182

(58) Field of Classification Search
USPC ................................ 726/5; 713/182, 183, 184
See application file for complete search history.

(56) References Cited

U.S. PATENT DOCUMENTS

| | | | |
|---|---|---|---|
| 7,685,431 B1* | 3/2010 | Mullany | 713/184 |
| 2004/0177272 A1* | 9/2004 | Walters | 713/201 |
| 2008/0307235 A1* | 12/2008 | Keohane et al. | 713/183 |
| 2009/0150677 A1* | 6/2009 | Vedula et al. | 713/183 |

* cited by examiner

*Primary Examiner* — Ellen Tran
(74) *Attorney, Agent, or Firm* — Myers Bigel Sibley & Sajovec

(57) ABSTRACT

Apparatus, methods and/or computer program products are provided that facilitate the creation and management of secure passwords. Upon receiving a proposed password from a user for use in a computer system, apparatus or other communication system, the proposed password is evaluated for compliance with security guidelines. If the password complies at least with a minimum level of security, the password is evaluated and a relative level of the password is determined and assigned to the password. A lifespan for the password is selected based on the assigned relative security level of security. The user is notified of the assigned lifespan. Operations for evaluating the password, assigning the lifespan, and notifying the user of the lifespan may be performed in substantially real-time.

3 Claims, 2 Drawing Sheets

APPARATUS, METHODS, AND COMPUTER PROGRAM PRODUCTS FOR FACILITATING SECURE PASSWORD CREATION AND MANAGEMENT

BACKGROUND

The present application relates generally to computer systems and networks, and, more particularly, to passwords for accessing computer systems and networks.

Communications networks are widely used for nationwide and worldwide communication of voice, multimedia and/or data. As used herein, the term "communications networks" includes public communications networks, such as the Public Switched Telephone Network (PSTN), terrestrial and/or satellite cellular networks, private networks and/or the Internet.

The Internet is a decentralized network of computers that can communicate with one another via Internet Protocol (IP). The Internet includes the World Wide Web (web) service facility, which is a client/server-based facility that includes a large number of servers (computers connected to the Internet) on which web pages or files reside, as well as clients (web browsers), which interface users with the web pages. The topology of the web can be described as a network of networks, with providers of network services called Network Service Providers, or NSPs. Servers that provide application-layer services may be referred to as Application Service Providers (ASPs). Sometimes a single service provider provides both functions.

It is common to use passwords to allow users to access various web-based services, computer systems, and other types of communications networks. Most security systems require passwords to be of a certain length and complexity. In these systems, passwords that satisfy a rigid set of proscribed requirements are then generally granted a common duration of useful life, after which the end user may be required to supply or generate a new password, or access to the system may be terminated.

However, because the use of passwords is so pervasive, it is not unusual for a user to have to remember a large number of different passwords. It may be difficult for users to remember large numbers of passwords, particularly complex passwords that satisfy strong security measures. Because users may be required to generate new passwords periodically, many users may create passwords that are sufficient to satisfy only the minimum level of security deemed acceptable. For services where password access is required, but where market requirements call for a broad appeal to a large user base, overly-restrictive password requirements can reduce a service's appeal. On the other hand, under-restrictive password requirements may cause a greater risk of customer data compromise.

SUMMARY

According to exemplary embodiments, apparatus, methods and/or computer program products are provided that facilitate the creation and management of secure passwords. Upon receiving a proposed password from a user (e.g., via a computer apparatus or other device in communication with a web service, computing system, communication system, etc.), the proposed password is evaluated for compliance with security guidelines. If the password complies at least with a minimum level of security, the password is evaluated and a relative security level is assigned to the password. A lifespan for the password is selected based on the assigned relative security level, and the user is notified of the assigned lifespan.

In some embodiments, operations for evaluating a password, assigning a lifespan, and notifying a user of the lifespan are performed in substantially real-time.

According to some embodiments, determining the relative security level of a password includes one or more of the following: identifying the number of consecutive identical characters in the password, identifying the number of alphabetically sequential characters in the password, comparing the password with dictionary words, and determining if the password is a commonly used password. However, embodiments are not limited to these heuristic qualities. According to some embodiments of the present invention, the lifespan assigned to a password is proportional to the level of security of the password. For example, a long lifespan is assigned to a password with a high level of security, and a short lifespan is assigned to a password with a low level of security. Thus, passwords with a relatively low level of security are retired quicker than passwords with a relatively high level of security.

Embodiments allow for secure access using lower security passwords for systems whose sensitivity warrants the accommodation of users incapable of managing more secure passwords.

Computer systems utilizing a password evaluation and lifespan assignment system, according to embodiments of the present invention, have numerous advantages. For example, users not able to create and/or manage more secure passwords may be allowed to access a service, apparatus, and/or system using a lower-security password that still satisfies a minimum level of security. In addition, by allowing the use of simple, yet secure passwords, web sites and other systems can achieve a greater level of user base attraction than conventional systems. Furthermore, embodiments may facilitate the creation of more secure passwords by providing tangible feedback to users and a tangible reward for selecting a demonstrably more secure password.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
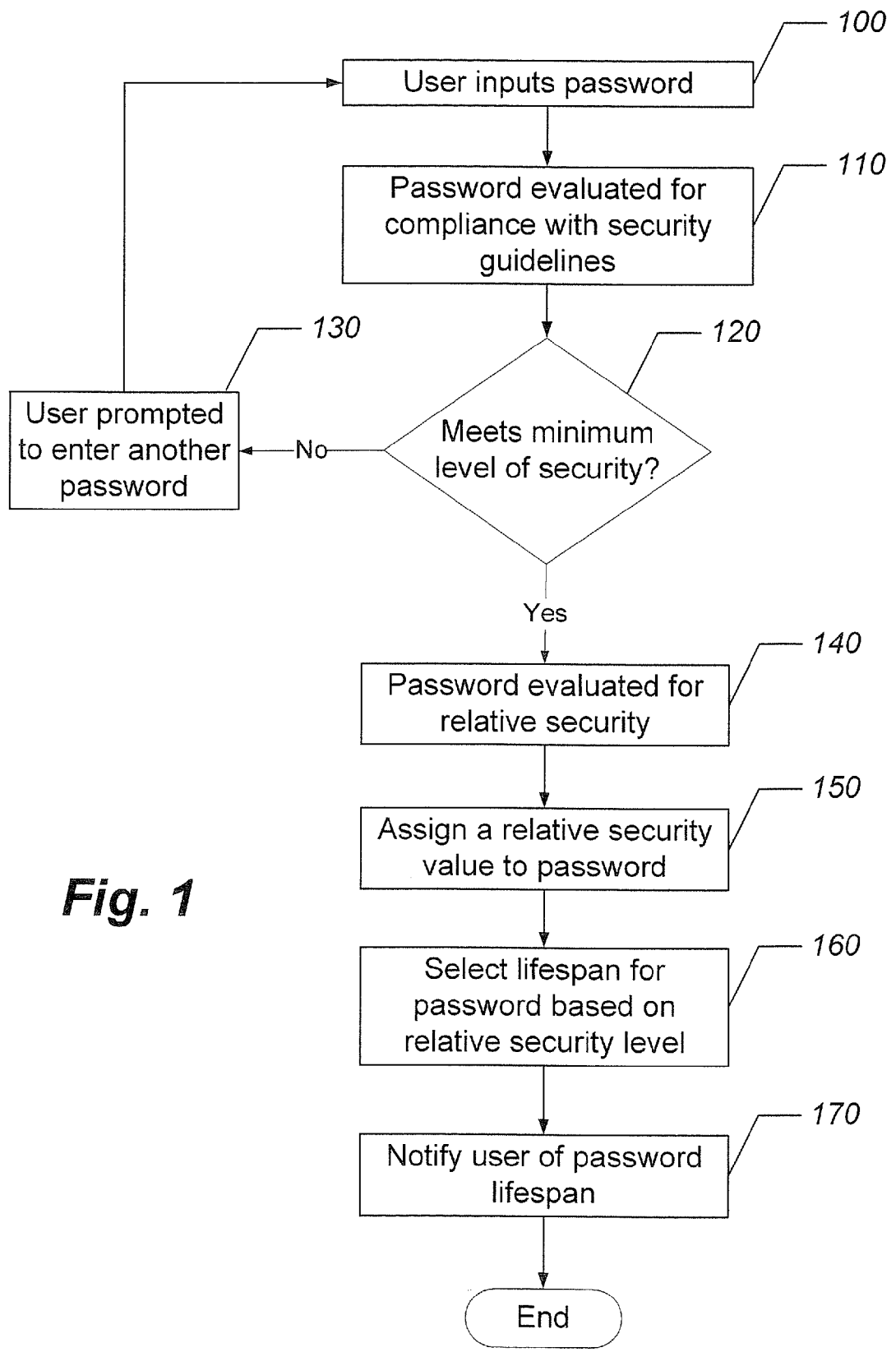
FIG. 1 is a flowchart that illustrates exemplary operations for facilitating the creation and management of secure passwords, according to some embodiments.

While various modifications and alternative forms of the embodiments described herein may be made, specific embodiments are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "real-time", as used herein, refers to a level of computer responsiveness that a user senses as sufficiently immediate. For example, receiving notification of the lifespan of a proposed password substantially immediately upon entering the password into a computing apparatus is considered in "real-time."

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a flowchart of operations for facilitating the creation and management of secure passwords, according to some embodiments. Initially, a user enters a proposed password into a computer apparatus via an input device in communication with the computer apparatus (Block 100). For example, the user enters the password via a keyboard or keypad. The password may (or may not) be displayed within a display or monitor. In some embodiments, the characters of the password may be hidden or masked, or substitute characters may be displayed (e.g., "*" may be used for each character). A processor receives the proposed password and evaluates the proposed password for compliance with security guidelines (Block 110). Evaluation includes analyzing the proposed password for compliance with guidelines that would enforce a minimum level of security. For example, a determination is made whether the proposed password has a required minimum number of characters and/or a combination of alphabetical characters and at least one numerical character. If the determination is made that the proposed password does not meet a minimum level of security (Block 120), the user is prompted to enter another proposed password (Block 130). If the determination is made that the proposed password does meet a minimum level of security (Block 120), the password is then evaluated for relative security (Block 140).

Relative security nay be based upon various characteristics (also referred to as "quality heuristics") of the password. Various characteristics are analyzed including, but not limited to, the number of consecutive identical characters in the password, the number of alphabetically sequential characters in the password, whether the password contains one or more dictionary words, and whether the password is a commonly used password. Embodiments of the present invention are not limited only to these characteristics of relative security. Various other characteristics may be utilized, without limitation.

It is generally believed that passwords not having consecutive identical characters are more secure than passwords with consecutive identical characters. The security level is enhanced because the lack of consecutive identical characters creates uniqueness and causes a password to become difficult to derive by others. Also, it is generally believed that passwords without alphabetically sequential characters are more secure than passwords having alphabetically sequential characters. The security level is enhanced because the lack of alphabetically sequential characters creates uniqueness and causes a password to become difficult to derive by others.

It is generally believed that passwords containing one or more dictionary words (i.e., words that are a part of a language and that may be found in a dictionary) are less secure than passwords not containing dictionary words. The security level is enhanced for passwords not containing dictionary because the non-dictionary words create uniqueness and cause the password to become difficult to derive by others. It is generally believed that passwords having a lower frequency of use by others are more secure than passwords having a higher frequency of use. For example, a commonly used password is the term "password." Because of its high frequency of use by others, this password has a low security level.

Taking into consideration the various characteristics discussed above for the password, a relative security value is assigned to the password (Block 150). For example, a scale of 1-100 could be used wherein 100 is the highest relative security value and 1 is the lowest security value. Embodiments described herein, however, are not limited to this relative security scale. Various scales and/or ways of assigning a relative security value to a password may be utilized. Using the assigned relative security value, a lifespan is selected and assigned to the password (Block 160). The user is then notified of the lifespan for the password he/she selected (Block 170).

According to embodiments, password lifespan is proportional to the relative security value of the password. For example, a password with the highest relative security value (e.g., 100, using the above-described scale) may have an unlimited lifespan (i.e., the password never expires). For passwords with low relative security values, lifespans may be on the order of weeks, months or, perhaps, hours. As such, a user would be required to replace a password at the end of the password's lifespan. Thus, embodiments of the present invention may facilitate the creation of more secure passwords by providing tangible feedback to users and a tangible reward for selecting a demonstrably more secure password.

Figure 2:
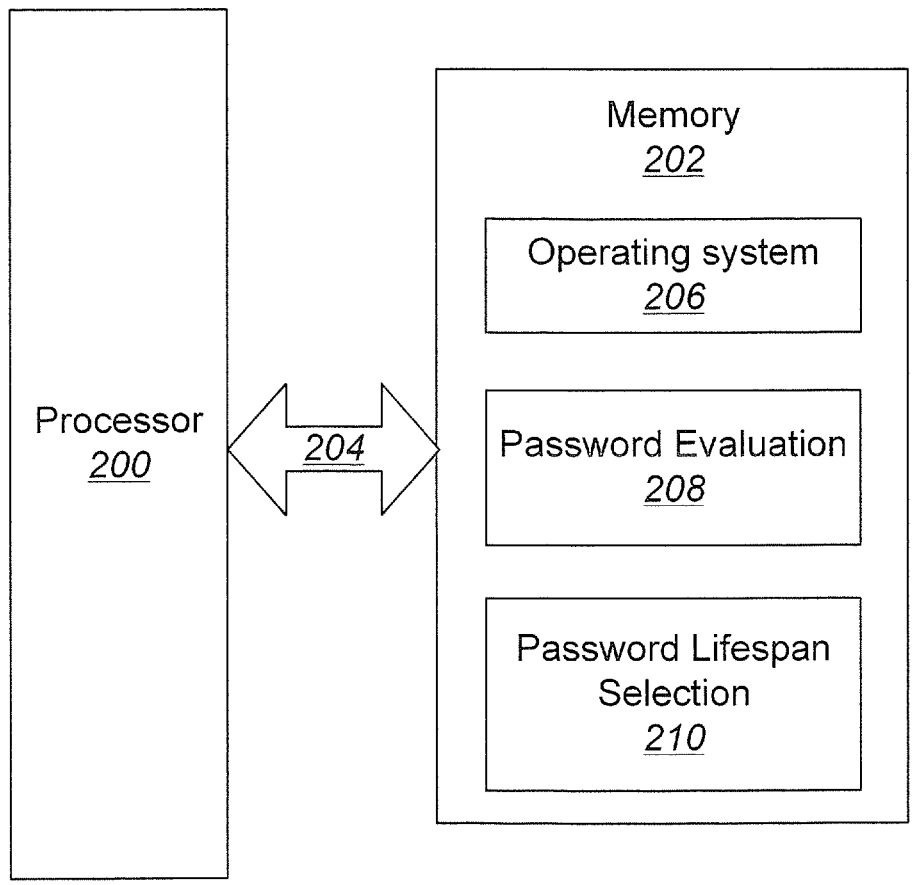
FIG. 2 is a block diagram that illustrates details of an exemplary processor and memory that may be used by a device or system, according to some embodiments.

FIG. 2 illustrates an exemplary processor 200 and memory 202 that may be used by a device or system, according to some embodiments. The processor 200 communicates with the memory 202 via an address/data bus 204. The processor 200 may be, for example, a commercially available or custom microprocessor. The memory 202 is representative of the overall hierarchy of memory devices containing the software and data used to implement a device or system for creating and managing secure passwords as described herein, in accordance with some embodiments. The memory 202 may include, but is not limited to, the following types of devices: cache, ROM, PROM, EPROM, EEPROM, flash, SRAM, and DRAM.

As shown in FIG. 2, the memory 202 may hold various categories of software and data: an operating system 206, a password evaluation module 208, and a password lifespan selection module 210. The operating system 206 controls operations of the apparatus or system used to evaluate password security and to assign a lifespan to a password. In particular, the operating system 206 may manage the resources of a device or systems and may coordinate execution of various programs (e.g. the password evaluation module 208, and a password lifespan selection module 210, etc.) by the processor 200.

The password evaluation module 208 comprises logic for evaluating a proposed password for compliance with security guidelines, and for evaluating a password for relative security, as described above. The password lifespan selection module 210 comprises logic for selecting a password lifespan based upon a relative security value assigned to a password, as described above.

Many variations and modifications can be made to the preferred embodiments without substantially departing from the principles of the present invention. All such variations and modifications are intended to be included herein within the scope of the present invention, as set forth in the following claims.

That which is claimed:

1. A method of facilitating the creation of secure passwords, comprising:
   receiving a proposed password from a user;
   evaluating the proposed password for compliance with security guidelines that would enforce a minimum level of security, comprising determining if the proposed password has a required number of characters and a combination of alphanumeric characters and a numerical character;
   in response to determining that the proposed password does meet the minimum level of security, evaluating the proposed password for relative security, comprising identifying a number of consecutive identical characters in the proposed password, identifying a number of alphabetically sequential characters in the proposed password, comparing the proposed password with dictionary words, determining if the proposed password is a commonly used password, and determining a frequency of use of the proposed password by other users;

assigning a relative security value to the proposed password;

selecting and assigning a lifespan to the proposed password based on the assigned relative security value, wherein an unlimited lifespan is assigned to the proposed password if the password has a highest level of security, and wherein a lifespan of a month or less is assigned to the proposed password if the proposed password has a lowest level of security; and notifying the user of the lifespan assigned to the proposed password;

wherein evaluating the proposed password for compliance with security guidelines that would enforce a minimum level of security, evaluating the proposed password for relative security, assigning a relative security value to the proposed password, selecting and assigning a lifespan to the proposed password based on the assigned relative security value, and notifying the user of the lifespan assigned to the proposed password are performed in real time.

2. A computer apparatus, comprising:

a processor;

a memory coupled to the processor comprising instructions that when executed by the processor causes the processor to perform operations comprising:

receiving a proposed password from a user;

evaluating the proposed password for compliance with security guidelines that would enforce a minimum level of security, comprising determining if the proposed password has a required number of characters and a combination of alphanumeric characters and a numerical character;

in response to determining that the proposed password does meet the minimum level of security, evaluating the proposed password for relative security, comprising identifying a number of consecutive identical characters in the proposed password, identifying a number of alphabetically sequential characters in the proposed password, comparing the proposed password with dictionary words, determining if the proposed password is a commonly used password, and determining a frequency of use of the proposed password by other users;

assigning a relative security value to the proposed password; and selecting and assigning a lifespan to the proposed password based on the assigned relative security value, wherein an unlimited lifespan is assigned to the proposed password if the password has a highest level of security, and wherein a lifespan of a month or less is assigned to the proposed password if the proposed password has a lowest level of security; and notifying the user of the lifespan assigned to the proposed password;

wherein evaluating the proposed password for compliance with security guidelines that would enforce a minimum level of security, evaluating the proposed password for relative security, assigning a relative security value to the proposed password, selecting and assigning a lifespan to the proposed password based on the assigned relative security value, and notifying the user of the lifespan assigned to the proposed password are performed in real time.

3. A computer program product, comprising a non-transitory computer readable storage medium having encoded thereon instructions that, when executed on a computer, causes the computer to perform operations comprising:

receiving a proposed password from a user;

evaluating the proposed password for compliance with security guidelines that would enforce a minimum level of security, comprising determining if the proposed password has a required number of characters and a combination of alphanumeric characters and a numerical character;

in response to determining that the proposed password does meet the minimum level of security, evaluating security of the proposed password for relative security, comprising identifying a number of consecutive identical characters in the proposed password, identifying a number of alphabetically sequential characters in the proposed password, comparing the proposed password with dictionary words, determining if the proposed password is a commonly used password, and determining a frequency of use of the proposed password by other users;

assigning a relative security value to the proposed password; and selecting and assigning a lifespan to the proposed password based on the assigned relative security value, wherein an unlimited lifespan is assigned to the proposed password if the password has a highest level of security, and wherein a lifespan of a month or less is assigned to the proposed password if the proposed password has a lowest level of security; and notifying the user of the lifespan assigned to the proposed password;

wherein evaluating the proposed password for compliance with security guidelines that would enforce a minimum level of security, evaluating the proposed password for relative security, assigning a relative security value to the proposed password, selecting and assigning a lifespan to the proposed password based on the assigned relative security value, and notifying the user of the lifespan assigned to the proposed password are performed in real time.

* * * * *